March 31, 1936.  S. PATT  2,036,094
SAUCE MAKING MACHINE
Filed Nov. 5, 1934
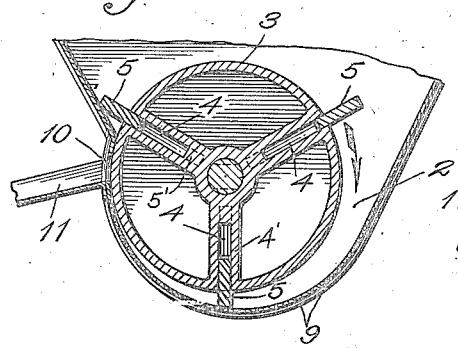
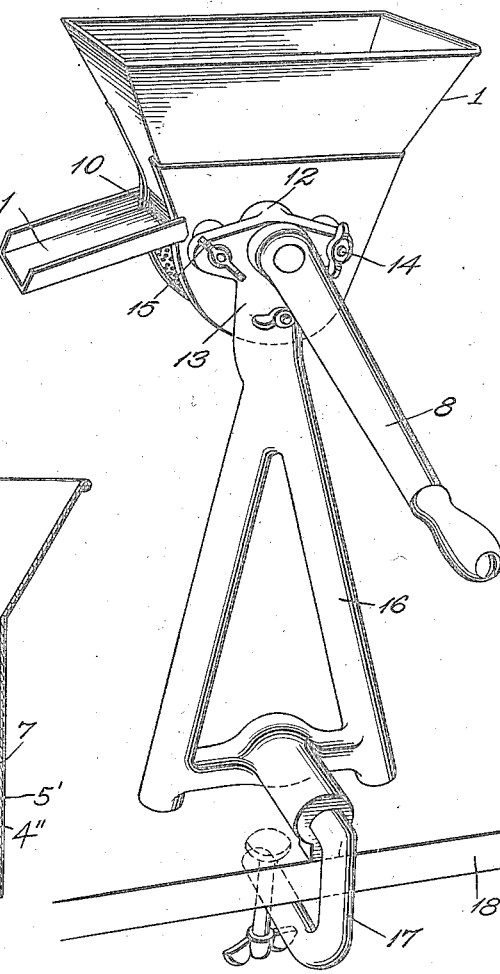
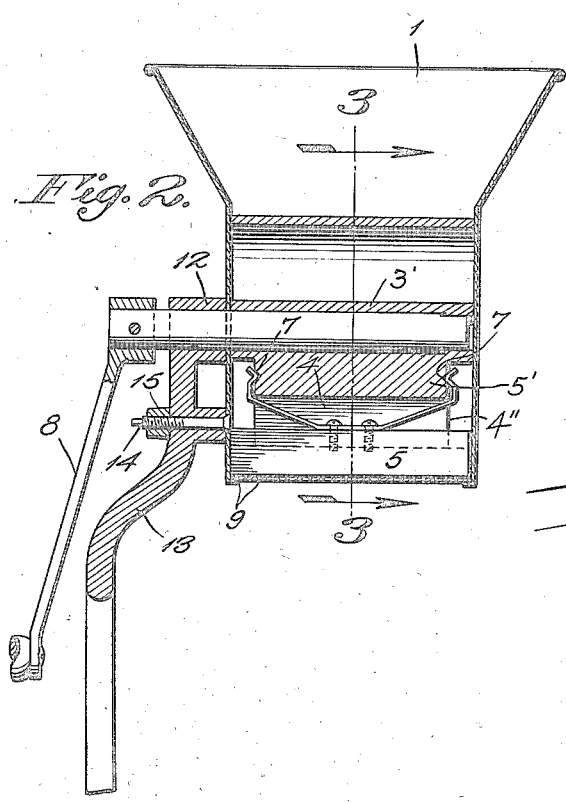
Sylvester Patt
INVENTOR
BY Victor J. Evans & Co.
ATTORNEY
WITNESS:

Patented Mar. 31, 1936

2,036,094

UNITED STATES PATENT OFFICE 2,036,094

SAUCE MAKING MACHINE

Sylvester Patt, Willoughby, Ohio

Application November 5, 1934, Serial No. 751,624

1 Claim. (Cl. 146—174)

This invention relates to a machine for extracting juices from fruits, vegetables and the like, and has for the primary object the provision of a device of this character which will easily and efficiently remove juices and pulp from the refuse (such as skin and seeds) and discharge the juices and pulp separately from refuse and which may be operated with minimum effort and will be simple and durable in construction and may be manufactured at low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a machine for extracting juices and constructed in accordance with my invention.

Figure 2 is a fragmentary vertical sectional view illustrating the same.

Figure 3 is a sectional view taken on the line 3—3 of Figure 2.

Referring in detail to the drawing, the numeral 1 indicates a hopper, the lower portion of which is substantially semi-cylindrical in shape to form a crushing chamber 2. A shaft enters the crushing chamber and is secured in the hub of a drum 3 located eccentrically of the chamber 2. Connecting the hub 3' and the periphery of the drum there are radially disposed, substantially rectangular spokes 4'. The periphery of the drum has longitudinal openings therethrough which register with longitudinal slots 4 in the spokes and the said spokes have end slots 4'' between the hub 3' and the periphery of the drum. Each spoke, between the slots 4'' and 4 is thus provided with an inner block-like shoulder 5' that projects from the hub 3'. Movable through the slot 4 of each spoke, and, of course, movable through the periphery of the drum, there is a substantially rectangular blade 5. Each blade has fixed on its inner edge the center of a substantially U-shaped leaf spring 6 and the inwardly inclined ends of these springs have angle or tooth portions to be received in notches 7 in the end walls of the blocks or parts 5'. The blades are thus effectively guided for movement by the slotted spokes through the drum and are likewise removably associated with the drum. The springs permit the blades to move inwardly when under pressure or when contacting with the walls of the chamber 2. One end of the shaft is equipped with a crank handle 8 so that the drum may be easily rotated and during the rotation thereof in the direction of the arrow in Figure 3, will bring about crushing of fruit or vegetables placed in the hopper. The curved wall of the chamber 2 is provided with a series of perforations 9 to permit the juices and pulp of the fruit or vegetables to escape and may be caught in a suitable receptacle. The chamber 2 is provided with an outlet port 10 communicative with a trough 11. The refuse is discharged into the trough 11 by way of the outlet port 10. The trough is preferably disposed on an inclined plane so that the refuse may gravitate therefrom and be caught in a receptacle.

The shaft of the drum is journaled in a bearing 12 forming an integral part of a bracket 13 and the latter is apertured to receive bolts 14 carried by the hopper and on which are turned thumb nuts 15 whereby the hopper is firmly secured to the bracket 13 and may be detached therefrom when desired. The handle 8 is removable from the shaft so that the removal of the hopper from the bracket can be had after the removal of the nuts 15 from their bolts. The bracket 13 is integral with a stand 16 carrying at its lower end a clamp 17 for detachably securing the stand to a support 18.

Having described the invention, I claim:

A fruit juice extracting machine having a crushing chamber, a hollow drum comprising a crushing member eccentrically arranged in said chamber and said drum having a central hub and substantially rectangular spokes radiating from the hub to the periphery of the drum, a shaft fixed in the hub and journaled through the chamber, said drum having longitudinal rectangular peripheral openings and said spokes having longitudinal slots aligning with said openings and having side slots to afford inner block extensions between the hub and spokes and which blocks have their side walls notched and substantially rectangular blades received in the openings of the drum and in the longitudinal slots of the spokes and substantially U-shaped springs fixed to the inner edges of said blades and having their ends formed with tooth portions to be received in the notched side walls of the blocks.

SYLVESTER PATT.